United States Patent
Duggan

(10) Patent No.: US 7,052,399 B2
(45) Date of Patent: May 30, 2006

(54) ELASTOMERIC COUPLING FOR ROTATING SHAFTS

(75) Inventor: James A. Duggan, Temperance, MI (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 10/690,247

(22) Filed: Oct. 21, 2003

(65) Prior Publication Data
US 2005/0085304 A1   Apr. 21, 2005

(51) Int. Cl.
F16D 3/60   (2006.01)

(52) U.S. Cl. .................... 464/69; 464/93; 464/125

(58) Field of Classification Search .......... 464/69, 464/70, 87, 92, 93, 98, 55, 56, 125, 136, 464/904, 905; 267/152–154, 161; 403/220, 403/223; 248/635
See application file for complete search history.

(56) References Cited

U.S. PATENT DOCUMENTS

| | | | | |
|---|---|---|---|---|
| 239,952 | A | * | 4/1881 | Harvey ........................ 464/125 |
| 1,781,409 | A | * | 11/1930 | Rayfield ..................... 464/69 X |
| 2,965,349 | A | * | 12/1960 | Hutton ...................... 403/223 X |
| 3,135,103 | A | * | 6/1964 | Black ........................ 464/70 X |
| 3,238,745 | A | * | 3/1966 | Burroughs ..................... 464/56 |
| 3,296,827 | A | * | 1/1967 | Landon, Jr. et al. .......... 464/92 |
| 3,500,659 | A | * | 3/1970 | Martin ........................ 464/93 |
| 3,668,891 | A | * | 6/1972 | Brizzolesi ..................... 464/69 |
| 3,739,600 | A | | 6/1973 | Pere |
| 3,766,972 | A | | 10/1973 | Kitano et al. |
| 4,188,802 | A | | 2/1980 | Zeidler et al. |
| 4,249,396 | A | | 2/1981 | Ziegler |
| 4,424,046 | A | | 1/1984 | Ziegler |
| 4,464,138 | A | * | 8/1984 | Decker ........................ 464/56 |
| 4,680,984 | A | | 7/1987 | Wahling et al. |
| 4,705,489 | A | | 11/1987 | Haarmann et al. |
| 4,790,794 | A | * | 12/1988 | Takeda et al. ................. 464/93 |
| 4,804,352 | A | | 2/1989 | Schmidt |
| 5,562,545 | A | | 10/1996 | Wahling et al. |
| 5,766,675 | A | | 6/1998 | Andra et al. |
| 6,068,555 | A | | 5/2000 | Andra et al. |
| 6,264,164 | B1 | | 7/2001 | Steinmaier |
| 6,315,670 | B1 | | 11/2001 | Andra et al. |
| 6,343,777 | B1 | | 2/2002 | Andra |
| 6,622,975 | B1 | | 9/2003 | Steinmaier |
| 6,634,793 | B1 | | 10/2003 | Zimmermann |
| 2004/0224778 | A1 | * | 11/2004 | Menosky et al. |
| 2005/0075173 | A1 | * | 4/2005 | Kotsusa ....................... 464/69 |

* cited by examiner

FOREIGN PATENT DOCUMENTS

WO    WO 03/064878 A1 *   8/2003

OTHER PUBLICATIONS

Universal Joint and Driveshaft Design Manual, Section 3.1.5, pp. 93-95 (1991).

*Primary Examiner*—Greg Binda
(74) *Attorney, Agent, or Firm*—MacMillan, Sobanski & Todd, LLC

(57) ABSTRACT

An elastomeric coupling for a rotating shaft includes a driving yoke, a driven yoke, and a substantially circular elastomeric body having a circumferential face and first and second sets of bushings within the elastomeric body. The bushings have threaded openings exposed at the circumferential face. A plurality of fasteners secures the driving yoke to the first set of bushings and secures the driven yoke to the second set of bushings. A plurality of tensile members are located within the elastomeric body, with the tensile members connecting the first set of bushings to the second set of bushings.

18 Claims, 5 Drawing Sheets

ELASTOMERIC COUPLING FOR ROTATING SHAFTS

TECHNICAL FIELD

This invention relates in general to an elastomeric coupling for use in connecting a shaft from a driving force to a driven shaft. More particularly, the invention relates to an elastomeric coupling with high axial flexibility consisting of internally wound fibrous or metallic wire tensile members that remain in tension during angular operation, and especially an elastomeric coupling that may be used for a vehicular driveshaft.

BACKGROUND OF THE INVENTION

In most rear wheel drive vehicles, a source of rotational energy, such as an internal combustion or diesel engine, is located near the front of the vehicle. The engine is connected by means of a drive line to rotate one or more driven wheels, which are located near the rear of the vehicle. The drive line typically extends between a transmission, which is connected to the engine, and a differential, which is connected to an axle assembly and the driven wheels. In some vehicles, the distance separating the transmission and the differential is relatively short. In these vehicles, the drive line is composed of a single piece, jointed assembly which is usually referred to as a driveshaft. In other vehicles, the distance separating the transmission and the differential is relatively long, making the use of a one-piece driveshaft impractical. In these vehicles, the drive line is composed of a driveshaft and one or more coupling shafts. The coupling shafts are connected to the driveshaft (and to each other) by couplings.

Driveshaft couplings require a certain degree of flexibility to handle the axial displacement that occurs between the coupling shafts during rotation, especially at higher speeds and under driving conditions. Universal joints are commonly used to accommodate for the angular misalignment that occurs between the axes of intersecting shafts. Many other types of couplings are also known in the art, such as link-type couplings, Oldham's couplings, and variations thereof. However, these couplings have rigid components and therefore provide limited dampening properties under high torsional loads. These couplings are therefore associated with a higher degree of torsional disturbances during driving such as undesirable vibration or noise.

More recently, elastomeric flexible couplings have been introduced to provide for improved dampening properties and absorption of torsional loads. Some elastomeric couplings have internal fibers to assist in absorbing the torsional load during rotative operation. These couplings are placed between metal disks affixed to the ends of the two adjoining coupling shafts, similar to placing a rubber gasket between two metal half-flanges. However, the gasket-like flanges offer limited flexibility for angular misalignment between the intersecting shafts. Furthermore, torsional loads are not well distributed within the couplings due to the bending of internal fibers that occurs during rotation.

It would be desirable to create an elastomeric coupling with internal tensile members, wherein the coupling provides high angular flexibility while maintaining the internal tensile members in tension during angular operation for optimized torsional dampening effects.

SUMMARY OF THE INVENTION

The above objects, as well as other objects not specifically enumerated, are achieved by an elastomeric coupling for a rotating shaft, the elastomeric coupling including a driving yoke, a driven yoke, and a substantially circular elastomeric body having a circumferential face and first and second sets of bushings within the elastomeric body. The bushings have threaded openings exposed at the circumferential face. A plurality of fasteners secures the driving yoke to the first set of bushings and secures the driven yoke to the second set of bushings. A plurality of tensile members are located within the elastomeric body, the tensile members connecting the first set of bushings to the second set of bushings. According to this invention, there is also provided an elastomeric body suitable for use in an elastomeric coupling for a rotating shaft, the elastomeric body being substantially circular, and having a circumferential face and first and second sets of bushings within the elastomeric body. The bushings have threaded openings exposed at the circumferential face. The elastomeric body has sufficient flexibility to enable rotation of the elastomeric body about a central axis with the bushings from the first set of bushings rotating with the elastomeric body in one plane and the bushings in the second set of bushings rotating with the elastomeric body in a different plane.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
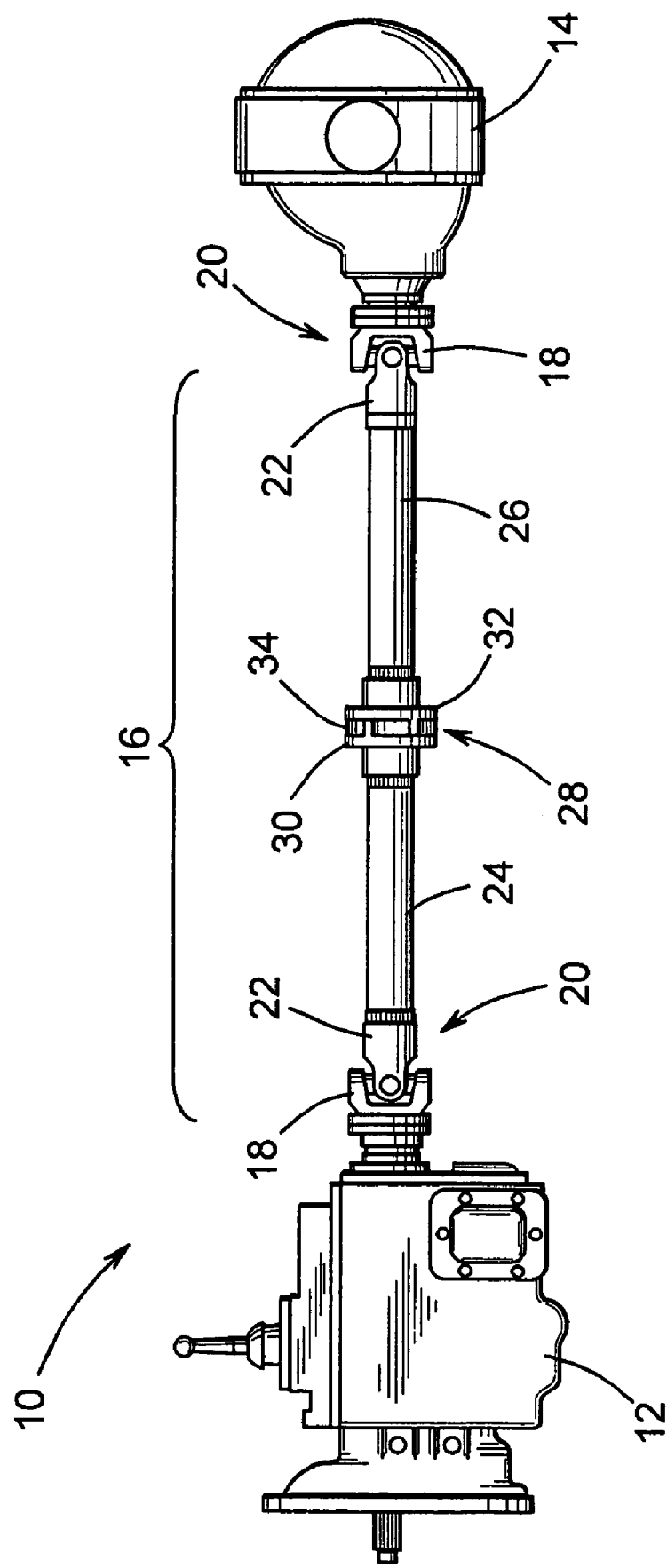
FIG. 1 is a cross-sectional view of a drive train for a vehicle including an elastomeric coupling in accordance with this invention for connecting a driveshaft to a coupling shaft.

Referring now to the drawings, there is illustrated in FIG. 1 a vehicle drive train, indicated generally at 10. The drive train 10 includes a transmission 12 that is connected to an axle assembly 14 through a driveshaft assembly 16. As is typical in vehicle drive trains 10, the transmission output shaft (not shown) and the axle assembly input shaft (not shown) are not always co-axially aligned. Therefore, universal joints 18 are positioned at each end 20 of the driveshaft assembly 16 to rotatably connect the driveshaft assembly 16 to the transmission output shaft and the axle assembly input shaft. The connection between the ends 20 of the driveshaft assembly 16 and the universal joints 18 are usually accomplished by end fittings 22, such as a tube yoke or a slip yoke.

In some vehicles, the distance separating the transmission 12 and the axle assembly 14 is relatively long, which makes the use of a one-piece driveshaft assembly 16 impractical. In these vehicles, the driveshaft assembly 16 is instead composed of a shorter driveshaft 24 and one or more coupling shafts 26 connected together by flexible elastomeric couplings 28. The flexible elastomeric coupling 28 shown in FIG. 1 consists of a driving yoke 30, a driven yoke 32, and an elastomeric body 34. The flexible elastomeric coupling 28 is shown with the driving yoke 30 and driven yoke 32 attached to splined ends of the driveshaft 24 and the coupling shaft 26, respectively. However, the yokes may be affixed to the driveshaft and coupling shaft by other means and in other locations that are known in the art. Also, the flexible elastomeric coupling 28 can be in other locations.

Figure 2:
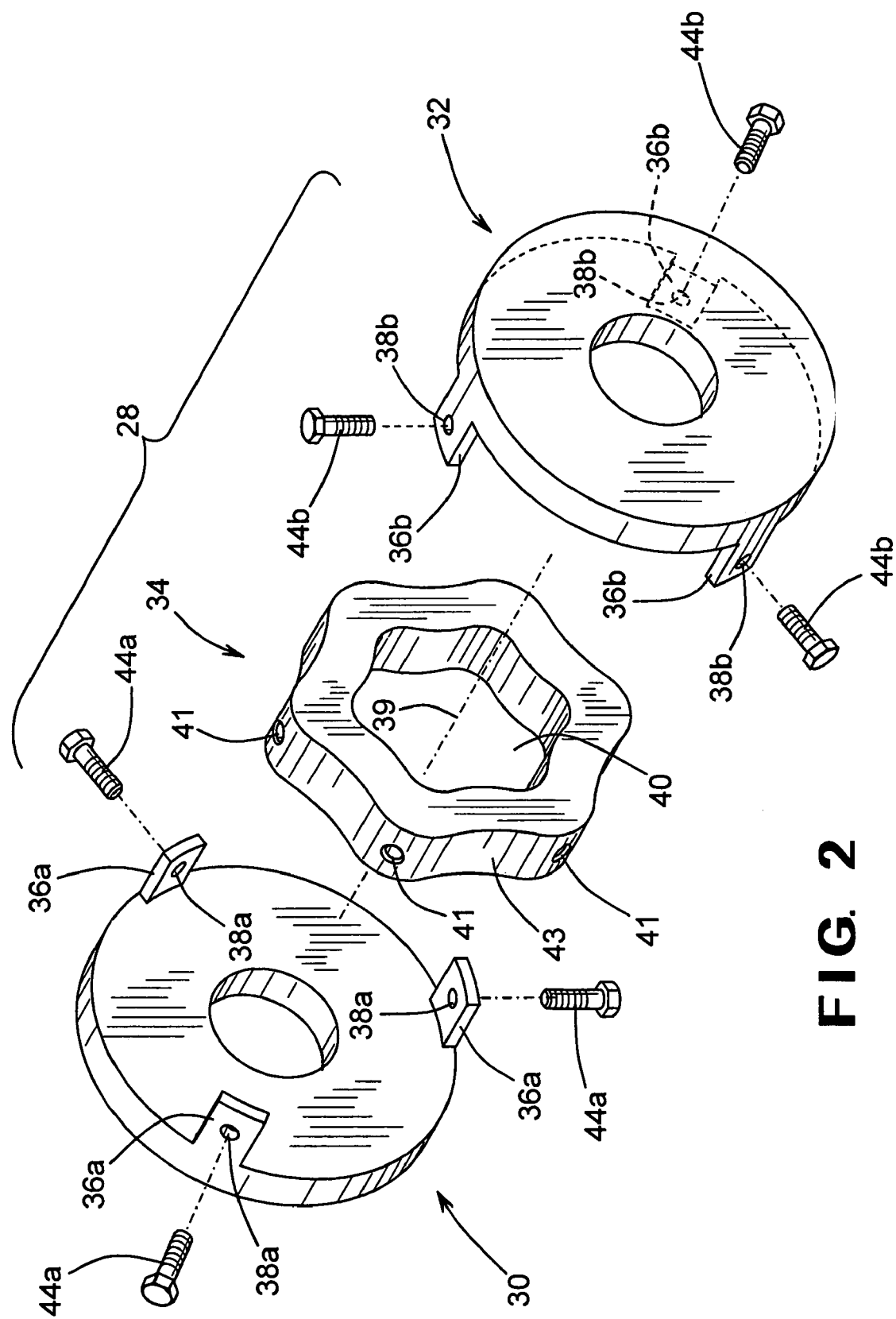
FIG. 2 is an exploded perspective view of the elastomeric coupling illustrated in FIG. 1 showing a plurality of yokes for connecting and transferring load from the driveshaft to the coupling shaft through an elastomeric body.

FIG. 2. shows the flexible elastomeric coupling 28 composed of a driving yoke 30, a driven yoke 32, and an elastomeric body 34. The elastomeric body 34 is made of a flexible material, such as rubber or other elastomers with similar flexibility. As discussed earlier, the driving yoke 30 and driven yoke 32 may be affixed to the driveshaft 24 and coupling shaft 26 by splined ends or other means not shown in FIG. 2. These methods of attaching the yokes 30, 32 to the driveshaft and coupling shaft are well known in the art. The driving yoke 30 contains a plurality of arms 36a with a bolt hole 38a located in each arm. Similarly, the driven yoke 32 contains a plurality of arms 36b with a bolt hole 38b located in each arm. In the preferred embodiment illustrated in FIG. 2, the driving yoke 30 contains three arms 36a and the driven yoke 32 contains three arms 36b.

The elastomeric body 34 of the flexible coupling 28 is substantially circular in shape and extends about a central axis of rotation 39. The preferred embodiment contains an open or hollowed center 40 to provide flexibility for angular misalignment and to accommodate an optional driveshaft centering mechanism (not shown). A plurality of threaded openings 41 are exposed on or located about the outer or circumferential face 43 of the elastomeric body 34. Preferably, the threaded openings 41 are spaced at equal circumferential distances around the elastomeric body 34, and preferably the threaded openings 41 are positioned at equal radial distances from the central axis 39.

Figure 3:
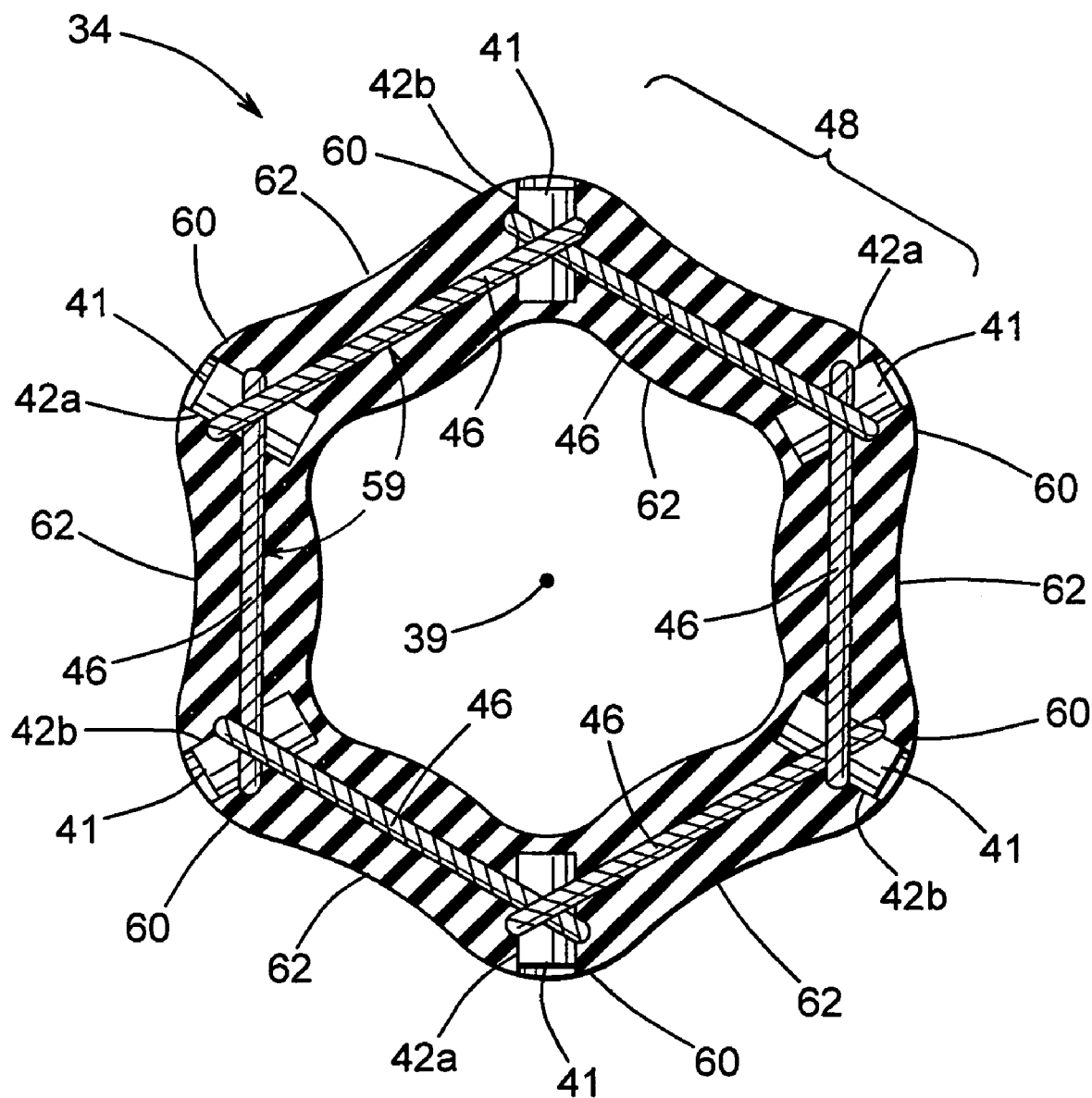
FIG. 3 is a cross-sectional side elevation view of the elastomeric body illustrated in FIG. 2 showing a plurality of tensile members wrapped around a plurality of drive and driven bushings, all being encapsulated in the elastomeric body.

FIG. 3 is a cross-sectional view of the elastomeric body 34 showing that the threaded openings 41 are associated with two sets of bushings 42a, 42b that are embedded within the elastomeric body 34. One set of bushings comprises the driving bushings 42a, and one set of bushings comprises the driven bushings 42b. The bushings 42a, 42b, which may be substantially cylindrical in shape as shown, are oriented so that each of the bushings 42a is spaced an equal distance apart from neighboring bushings 42b within the elastomeric body 34, with the driving bushings 42a alternating circumferentially with driven bushings 42b. As shown in FIG. 2, a first plurality of fasteners 44a can be used to radially affix the arms 36a of the driving yoke 30 to the driving bushings 42a, and a second plurality of fasteners 44b can be used to radially affix the arms 36b of the driven yoke 32 to the driven bushings 42b. The threaded openings 41 in the bushings 42a, 42b are oriented radially outwardly or perpendicular to the axis of rotation 39. Thus, the ends of the bushings 42a and 42b are mated to the flanges or arms 36a, 36b, respectively, with the fasteners 44a, 44b that engage the openings or bolt holes 38a, 38b and are inserted in the threaded openings 41.

The elastomeric body 34 also includes a plurality of tensile members 46 that are wrapped around the drive and driven bushings 42a, 42b and are also encapsulated within the elastomeric body 34. The tensile members 46 may be constructed of any desired material or materials, depending on the anticipated torsional load that will be placed on the tensile members 46. In the preferred embodiment, the tensile members 46 are constructed of wound metal fibers or strong organic fibers, such as Kevlar® aramid fibers. Each tensile member 46 is wrapped around or looped around one drive bushing 42a and one driven bushing 42b to create a wrapped set or pair, such as shown at 48, that contains two bushings 42a, 42b and one of the tensile members 46. As mentioned above, the threaded openings 41 in the bushings 42a, 42b are oriented perpendicular to the axis of rotation 39. The perpendicular orientation of the connection between the fasteners 44a and 44b and the bushings 42a, 42b is important because it allows torque to be applied in line with the rotating elastomeric body 34 without kinking the tensile members 46, as explained below.

Figure 4:
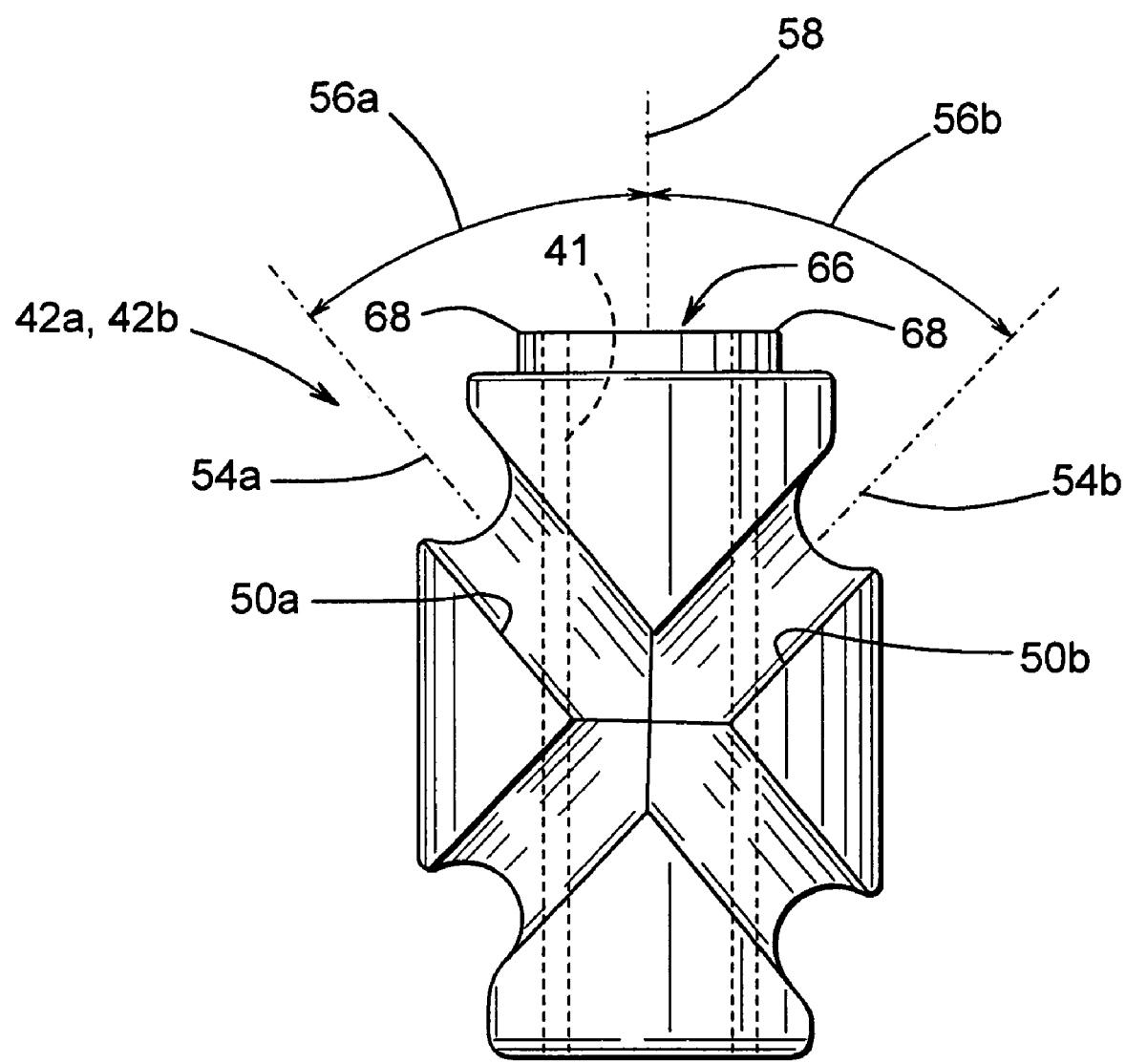
FIG. 4 is a side elevation view of one of the bushings illustrated in FIG. 3 in accordance with a first embodiment of this invention.

As best shown in FIG. 4, each of the bushings 42a, 42b has a pair of intersecting grooves 50a and 50b formed in the outer surface thereof. The grooves 50a, 50b are provided to respectively receive first and second ones of the tensile members 46 as they are looped around the bushings 42a, 42b. Each of the grooves 50a, 50b is generally semi-circular in cross sectional shape, although such is not required, and extends about the associated one of the bushings 42a, 42b. The grooves 50a, 50b define respective planes or axes 54a, 54b, respectively, that extend at angles 56a, 56b relative to axes 58 defined by the threaded openings 41 formed through the associated bushings 42a, 42b. In the illustrated embodiment, wherein six of the bushings 42a, 42b are provided within the elastomeric body 34, the angles 56a, 56b defines by the grooves 50a, 50b are all equal to approximately sixty degrees. However, the various angles 56a, 56b may differ, such as when a greater or lesser number of bushings 42a, 42b are provided within the elastomeric body 34.

Although the tensile members 46 are looped around the bushings 42a, 42b, there is a certain amount of freedom for each of the tensile members 46 to slip or shift within the grooves 50 to accommodate forces that may be applied to the tensile members 46 during operation of the elastomeric coupling 28. This slippage or shifting in the grooves 50 prevents the tensile members 46 from kinking when the elastomeric body 34 is distorted by bending during use.

As mentioned above, the fasteners 44a, 44b connect to the bushings 42a, 42b to the arms 36a, 36b of the yokes 30, 32, respectively, such that the bushings 42a, 42b are oriented perpendicularly relative to the central axis of rotation 39. This arrangement allows the tensile members 46 to remain looped or wrapped around the bushings 42a, 42b without twisting when the elastomeric body 34 is bent or distorted during rotation of the driveshaft assembly 16 under conditions where there is misalignment, i.e., angular articulation, between the driving yoke 30 and the driven yoke 32. In FIG. 3, it can be seen that the six tensile members 46 form a generally hexagonal shape within the elastomeric member 34, with adjacent pairs of tensile members 46 being aligned to form a common interior angle 59 of approximately one hundred twenty degrees. Each tensile member 46 is aligned along a load path that is on a direct line from one of the bushings 42a, 42b, to an adjacent bushing 42a, 42b. When the tensile members 46 are placed into tension, the load from the driving yoke 30 is transferred to the driven yoke 32 through the tensile members 46 in a load path that is aligned with the angular articulation about the central axis of rotation 39. This reduces bending or kinking of the tensile members 46 and, therefore, reduces frictional heat buildup in the tensile members 46. This orientation of the tensile members 46 within the elastomeric body 34 also provides greater torque capacity when there is angular articulation, i.e., non-straight line alignment of the coupling shaft 26 with respect to the driveshaft 24. Further, greater total angle capability or articulation between the coupling shaft 26 and the driveshaft 24 is allowed due to the reduced flex effort on the tensile members 46 when articulation occurs.

The illustrated elastomeric body 34 also includes a bushing mounting portion 60 for retaining each of the bushings 42a, 42b. The bushing mounting portions 60 are areas of the elastomeric body 34 that are reinforced or relatively stiff or thick to provide good support for the bushings 42a, 42b. Between each pair of the bushing mounting portions 60 is a connecting web portion 62. Each of the connecting web portions 62 can be formed in such a manner as to be more flexible than the adjacent bushing mounting portions 60. The increased flexibility of the connecting web portions 62 can be accomplished by, for example, forming such connecting web portions 62 from a different material than the material used to form the bushing mounting portions 60. Alternatively, the increased flexibility of the connecting web portions 62 can be accomplished by forming the connecting web portions 62 thinner or with a lesser amount of material than the bushing mounting portions 60. Also, the connecting web portions 62 can be configured with a radially inward bow or curved shape to enhance the flexibility of the connection between adjacent bushings 42a, 42b.

An optional feature of the invention is partially illustrated in FIG. 4, where the bushing 42a is shown as having a raised face or head 66 defined by shoulders 68. The head 66 has a non-round cross-sectional shape in a plan view, that can cooperate with corresponding-shaped non-round bolt holes 38a and 38b formed through the arms 36a and 36b of the driving and driven yokes 30 and 32, respectively. The shapes of the heads 66 of the bushings 42a, 42b can be any shape, such as square or hexagonal, that is suitable for preventing rotation of the bushings 42a, 42b relative to the arms 36a and 36b of the driving and driven yokes 30 and 32, respectively. One benefit of this rotation-preventing structure is that it can facilitate the process of tightening of the bolts 44a, 44b when the elastomeric coupling 28 is being assembled to the driving and driven yokes 30, 32, respectively.

The operation of this invention will now be explained with reference to the embodiment of the invention shown in FIGS. 2 and 3. As discussed above, the elastomeric body 34 contains six bushings in two sets, one set being the set of driving bushings 42a and the other set being the set of driven bushings 42b. The driving bushings 42a are connected to the driving yoke 30, and the driven bushings 42b are connected to the driven yoke 32. When assembled, the arms 36a of the driving yoke 30 and the arms 36b of the driven yoke 32 are spaced apart from each other at an angle of about sixty degrees. The bolt holes 38a in the yoke arms 36a are aligned with the bushings 42a in the elastomeric body 34, and the yoke arms 36a, 36b are attached to the elastomeric body 34 using fasteners 44a, 44b that extend into the threaded openings 41.

As is common in driveshaft applications, the driving yoke 30 and the driven yoke 32 may not be co-axially aligned and therefore will articulate in two different axes of rotation. The elastomeric body 34 is, therefore, formed from a material that has sufficient flexibility to enable the set of driving bushings 42a to be out of plane with the set of driven bushings 42b during rotation without tearing or otherwise damaging the flexible material of the elastomeric body 34. In addition, the connecting webs 62 of the elastomeric body 34 in the preferred embodiment are more flexible than the bushing mounting portions 60, thereby allowing the elastomeric body 34 to bend with minimal flex effort as the driving yoke 30 and the driven yoke 32 rotate in different planes. The reduced flex effort minimizes the heat buildup in the elastomeric body 34, thereby prolonging its life.

The elastomeric coupling 28 with internal tensile members 46 can accommodate high axial flexibility, i.e., articulation between the coupling shaft 26 and the driveshaft 24, while maintaining the internal tensile members 46 in tension and while operating with angular articulation for optimal torsional dampening effects. The wrapping of the tensile members 46 around the bushings 42a, 42b, allows the tensile members 46 to rotate about the bushings 42a, 42b through angular articulation. When the tensile members 46 are placed into tension, the load from the driving yoke 30 is transferred to the driven yoke 32 without bending or kinking of the tensile members 46. As a result, the load from the driving yoke 30 is efficiently transferred to the driven yoke 32 with reduced heat buildup in the tensile members while also providing greater torque capacity during articulation between the coupling shaft 26 and the driveshaft 24, and a greater total articulation angle capability.

Figure 5:
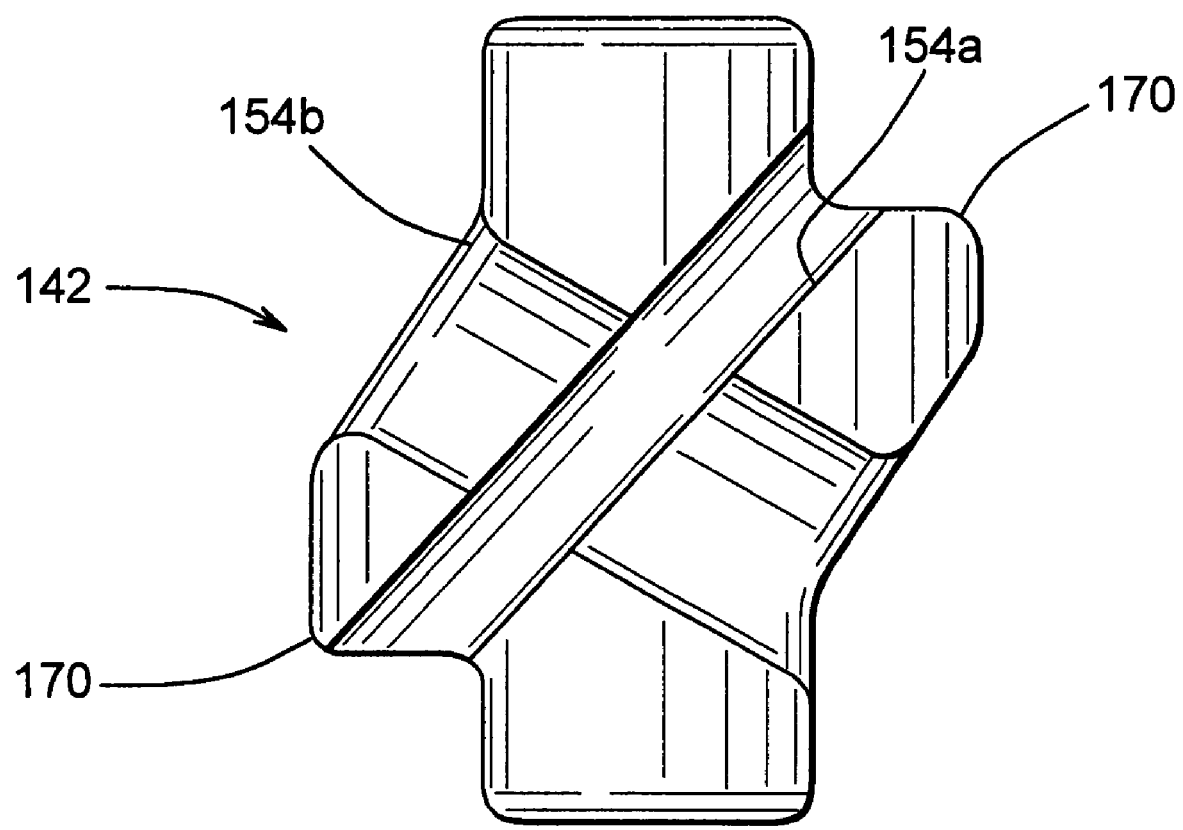
FIG. 5 is a side elevation view of one of the bushings illustrated in FIG. 3 in accordance with a second embodiment of this invention.

FIG. 5 illustrates a modified bushing 142 that can be used in lieu of the bushings 42a, 42b described above. As shown therein, the modified bushing 142 has a first groove 154a formed in the outer surface thereof for receiving a first one of the tensile members 46 therein. The first groove 154a is relatively narrow in width and deep in depth. The modified bushing 142 has a second groove 154b formed in the outer surface thereof for receiving a second one of the tensile members 46 therein. The second groove 154b is relatively wide in width and shallow in depth in comparison to the first groove 154a. In this embodiment, the first one of the tensile members 46 is oriented to receive or experience the tensile load in the primary rotational direction of the driveshaft assembly 16, i.e., the forward direction of movement of the vehicle. The reverse rotational direction does not normally experience the same loading. Thus, the tensile load in the reverse rotational direction of the vehicle can be handled by a secondary tensile member 46 that is smaller than the primary tensile member 46. The modified bushing 142 may be formed having one or more bulges, indicated at 170, that can assist in distributing the load of the modified bushing 142 at the interface with the elastomeric material of the elastomeric body 34, thereby reducing the concentration of stress at the interface.

The principle and mode of operation of this invention has been described in its preferred embodiments. However, it should be noted that this invention may be practiced otherwise than as specifically illustrated and described without departing from its scope. For example, although the yokes in the preferred embodiment are shown with three arms to accommodate six bushings in the elastomeric body, the benefits and spirit of the invention are still maintained if each yoke were to contain a greater or lesser number of arms, bushings, and wrapped bushing sets.

What is claimed is:

1. A coupling comprising:
   a first yoke including a plurality of first yoke arms;
   a second yoke including a plurality of second yoke arms; and
   a flexible body defining an axis, said body including a first plurality of bushings connected to said plurality of first yoke arms, a second plurality of bushings connected to said plurality of second yoke arms, and a plurality of tensile members connecting said first plurality of bushings with said second plurality of bushings, each of said first plurality of bushings being oriented generally radially relative to said axis of said body.

2. The coupling defined in claim 1 wherein a fastener extends between each of said plurality of first yoke arms and each of said first plurality of bushings to connect said first plurality of yoke arms to said body.

3. The coupling defined in claim 2 wherein each of said first plurality of bushings has an opening formed therein that is oriented generally radially relative to said axis of said body, and wherein each of said fasteners extends generally radially into engagement wit each of said openings formed in said first plurality of bushings.

4. The coupling defined in claim 3 wherein each of said openings is a threaded opening, and wherein each of said fasteners is a threaded fastener that extends generally radially into threaded engagement with each of said openings.

5. The coupling defined in claim 1 wherein each of said second plurality of bushings is oriented generally radially relative to said axis of said body.

6. The coupling defined in claim 5 wherein a first fastener extends between each of said plurality of first yoke arms and each of said first plurality of bushings to connect said first plurality of yoke arms to said body, and wherein a second fastener extends between each of said plurality of second yoke arms and each of said second plurality of bushings to connect said second plurality of yoke arms to said body.

7. The coupling defined in claim 6 wherein each of said first plurality of bushings has an opening formed therein that is oriented generally radially relative to said axis of said body, and wherein each of said first fasteners extends generally radially into engagement with each of said openings formed in said first plurality of bushings, and wherein each of said second plurality of bushings has an opening formed therein that is oriented generally radially relative to said axis of said body, and wherein each of said second fasteners extends generally radially into engagement with each of said openings formed in said second plurality of bushings.

8. The coupling defined in claim 7 wherein each of said openings formed in said first plurality of bushings is a threaded opening, and wherein each of said first fasteners is a threaded fastener that extends generally radially into threaded engagement with each of said threaded openings formed in said first plurality of bushings, and wherein each of said openings formed in said second plurality of bushings is a threaded opening, and wherein each of said second fasteners is a threaded fastener that extends generally radially into threaded engagement with each of said threaded openings formed in said first plurality of bushings.

9. A coupling comprising:
a first yoke including a plurality of first yoke arms;
a second yoke including a plurality of second yoke arms; and
a flexible body defining an axis, said body including a first plurality of bushings connected to said plurality of first yoke arms, a second plurality of bushings connected to said plurality of second yoke arms, and a plurality of tensile members connecting said first plurality of bushings with said second plurality of bushings, each of said first plurality of bushings having a pair of intersecting grooves formed in an outer surface thereof, each of said pair of grooves receiving one of said plurality of tensile members.

10. The coupling defined in claim 9 wherein each of said grooves is generally semi-circular in shape.

11. The coupling defined in claim 9 wherein each of said pair of grooves includes first and second grooves, said first grooves defining a first shape that is different than a second shape defined by said second grooves.

12. The coupling defined in claim 9 wherein each of said second plurality of bushings has a groove formed in an outer surface thereof that receives one of said plurality of tensile members.

13. The coupling defined in claim 12 wherein each of said grooves formed in said second plurality of bushings is generally semi-circular in shape.

14. The coupling defined in claim 12 wherein each of said second plurality of bushings has a pair of grooves formed in an outer surface thereof, each of said pairs of grooves formed in said second plurality of bushings receiving one of said plurality of tensile members.

15. The coupling defined in claim 14 wherein each of said pair of grooves formed in said second plurality of bushings includes first and second grooves, said first grooves defining a first shape that is different than a second shape defined by said second grooves.

16. A coupling comprising:
a first yoke including a plurality of first yoke arms;
a second yoke including a plurality of second yoke arms; and
a flexible body defining an axis, said body including a first plurality of bushings connected to said plurality of first yoke arms, a second plurality of bushings connected to said plurality of second yoke arms, and a plurality of tensile members connecting said first plurality of bushings with said second plurality of bushings, each of said first plurality of bushings being oriented generally radially relative to said axis of said body, each of said first plurality of bushings having a groove formed in an outer surface thereof that receives one of said plurality of tensile members.

17. The coupling defined in claim 16 wherein each of said second plurality of bushings is oriented generally radially relative to said axis of said body.

18. The coupling defined in claim 17 wherein each of said second plurality of bushings has a groove formed in an outer surface thereof that receives one of said plurality of tensile members.

* * * * *